Aug. 27, 1957  H. M. POLLEY  2,803,884
LENS MARKING DEVICES

Filed Jan. 31, 1955  2 Sheets-Sheet 1

INVENTOR
HERMAN M. POLLEY
BY
Louis L. Gagnon
ATTORNEY

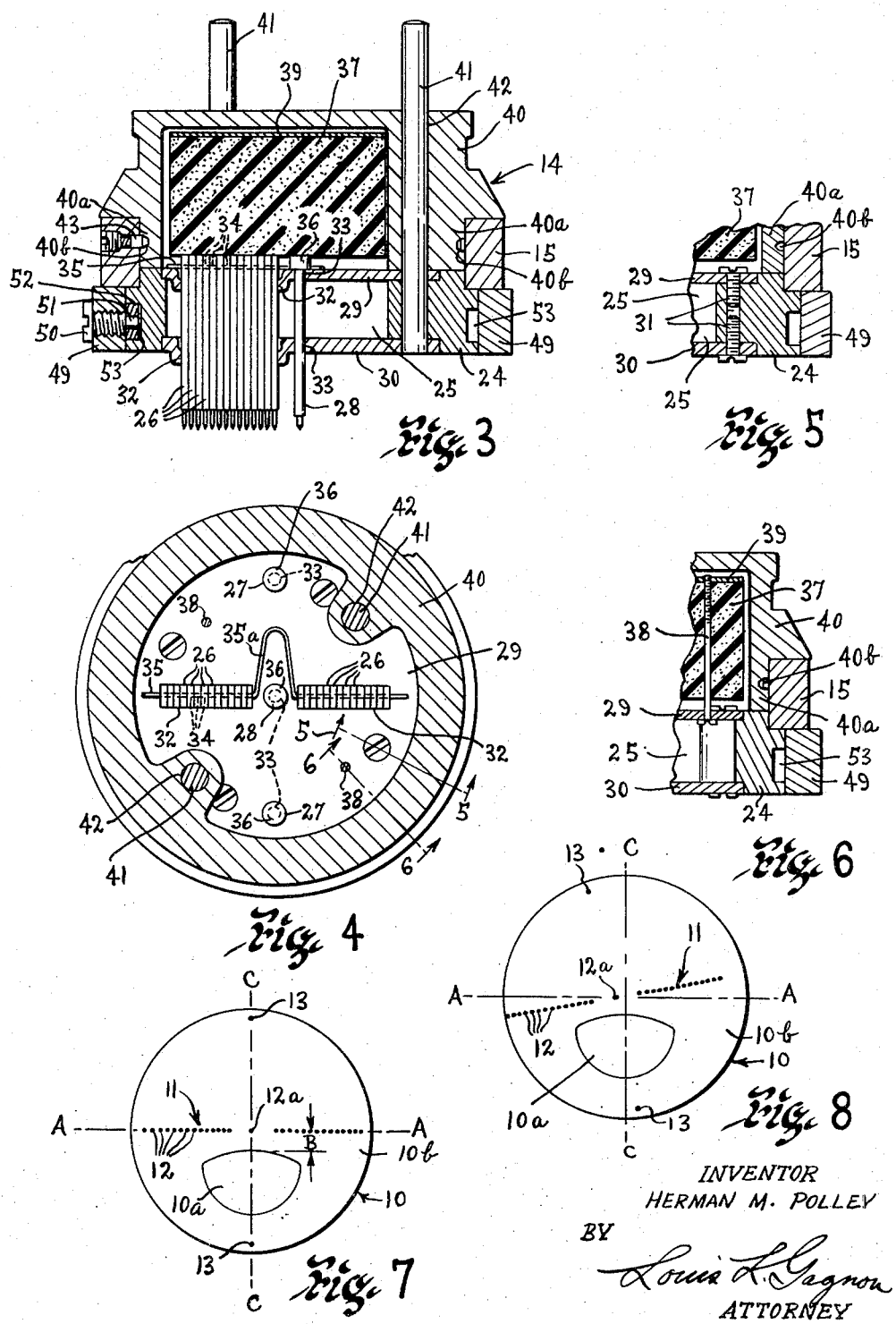

United States Patent Office 2,803,884
Patented Aug. 27, 1957

2,803,884

LENS MARKING DEVICES

Herman M. Polley, Southbridge, Mass., assignor to American Optical Company, Southbridge, Mass., a voluntary association of Massachusetts Application January 31, 1955, Serial No. 485,023

3 Claims. (Cl. 33—174)

This invention relates to improvements in lens marking devices and more particularly to a device for marking the cylindrical axis line, optical center and gauge points upon the surfaces of multifocal lens blanks, according to the prescriptive requirements desired of the finished lens, prior to the finishing of said lens blanks.

In the manufacture of ophthalmic lenses or the like and particularly lenses of the multifocal type wherein said lenses are usually comprised of a relatively small reading or segment portion surrounded by a distance or major portion, it is customary to provide one surface of the lens blanks, from which said ophthalmic lenses are manufactured, with suitable reference markings or the like to be used in the finishing of such lenses.

Such markings are used for the purposes of locating the optical center of the major portion of said lens blanks relative to said segment portions thereof, indicating the axial direction of a cylindrical surface curvature to be applied to the opposed side thereof, indicating positions at which to properly gauge the thicknesses of said lens blanks and for properly positioning the lens blanks to be cut to desired size and shape in a manner to be described in detail hereinafter.

One of the most efficient devices for applying said dots or axis markings, in the past, embodied the use of yieldingly supported inking pins which because of their construction and dimensional restrictions were of necessity spaced a considerable distance apart and caused the ink dots to be similarly spaced. In order to provide for sufficient accuracy of positioning and alignment of said dots with different lens fabrication devices they of necessity had to be formed relatively small in size or diameter and this size restriction combined with the wide spacing thereof resulted in considerable difficulty on the part of the operators in being able to properly discern said dots particularly when viewed through the blanks and at the usual working distance required. This not only caused eye strain and fatigue but was the source of considerable error.

Many attempts have been made to overcome the above disadvantages such as by the use of an inked wire or a narrow strip of rubber or the like for producing a continuous axis marking on the blanks. These procedures, however, encountered other difficulties. For example, when attempts were made to form a continuous axis marking on certain lenses, such as lenticular lenses or other lenses having irregular surface contours, the wires or narrow strips of rubber used in producing the axis marking would tend to straddle or bridge the hollow areas and produce markings only on the high spots of the surface. This resulted in improper and undesirable axis markings and further introduced difficulty in subsequent aligning operations.

It, therefore, is one of the primary objects of this invention to overcome all the above difficulties through the provision of simple, efficient and accurate means for applying the above markings with the assurance that said markings will extend throughout the length of the axis line so as to form a positive and accurate indication of said axis line which is readily perceivable and which will afford maximum accuracy in arriving at the prescriptive characteristics desired of the finished lens.

Another object is to provide a device which is adapted to provide a clearly discernible axis line of the above character upon the surface of a lens blank or the like regardless of the variations or irregularities in curvatures which might be encountered upon said surfaces of said lens blanks.

Another object is to provide a novel and simple means of yieldably retaining a composite row of marking portions of a device of the above character so as to permit each of said marking portions to individually contact and deposit a supply of marking fluid upon each adjacent portion of a lens surface to be marked, whereby said yieldable retaining means will permit said composite row of marking portions to precisely conform to the contour of a lens blank surface to be provided with said markings thereby producing accurate and distinct reference markings so closely related upon said lens blank surface as to produce the effect of a continuous line.

Another object is to provide a marking device of the above character comprising a supporting member having aligned guideways therein and elongated marking members slidably positioned in surface-to-surface relation with each other in said guideways, stop means at one end of said marking members for restricting the longitudinal movement thereof in a direction outwardly from said supporting member and a resilient pressure pad carried by said supporting member having one surface thereof in engagement with said inner ends of said marking members to cause said marking members to be yieldably urged outwardly therefrom, means for applying a marking fluid to the opposed ends of said marking members and means for moving said supporting member and marking members along a path substantially in line with the longitudinal dimension of said marking members to engage a surface of a lens blank, when said lens blank is properly aligned within said path of movement, to deposit said marking fluid upon said lens blank surface for reference purposes to be used for the finishing of said lens blank.

Another object is to provide angularly adjustable marking means for providing reference markings of the above character upon a surface of a lens blank or the like whereby a portion of said marking means is adapted to approach and engage the surface of said lens blank, to be marked, along a path substantially normal to the general plane of said lens surface so as to provide accurate reference markings thereon regardless of variations in surface curvature or in thickness which may be encountered in lens blanks of the character described above.

Another object is to provide a device of the above character having a diametrically disposed row of contiguously related marking members which are adapted to be angularly adjusted and to alternately engage an ink pad or the like and the finished surface of a semifinished multifocal lens blank which is suitably aligned to receive said marking members.

Another object is to provide a device of the above character which is relatively simple in construction, economical to manufacture and efficient in use.

Other objects and advantages of the invention will become apparent from the detailed description which follows when taken in conjunction with the accompanying drawings in which:

Fig. 3 is a cross-sectional view taken substantially on line 3—3 of Fig. 1;

Fig. 4 is a cross-sectional view taken on line 4—4 of Fig. 2;

Fig. 5 is a fragmentary cross-sectional view taken on line 5—5 of Fig. 4;

Fig. 6 is a fragmentary cross-sectional view taken on line 6—6 of Fig. 4;

Fig. 7 is a diagrammatic illustration of a multifocal lens blank having reference markings provided thereon; and Fig. 8 is an illustration generally similar to Fig. 7 with said reference markings alternatively positioned thereon.

Figure 1:
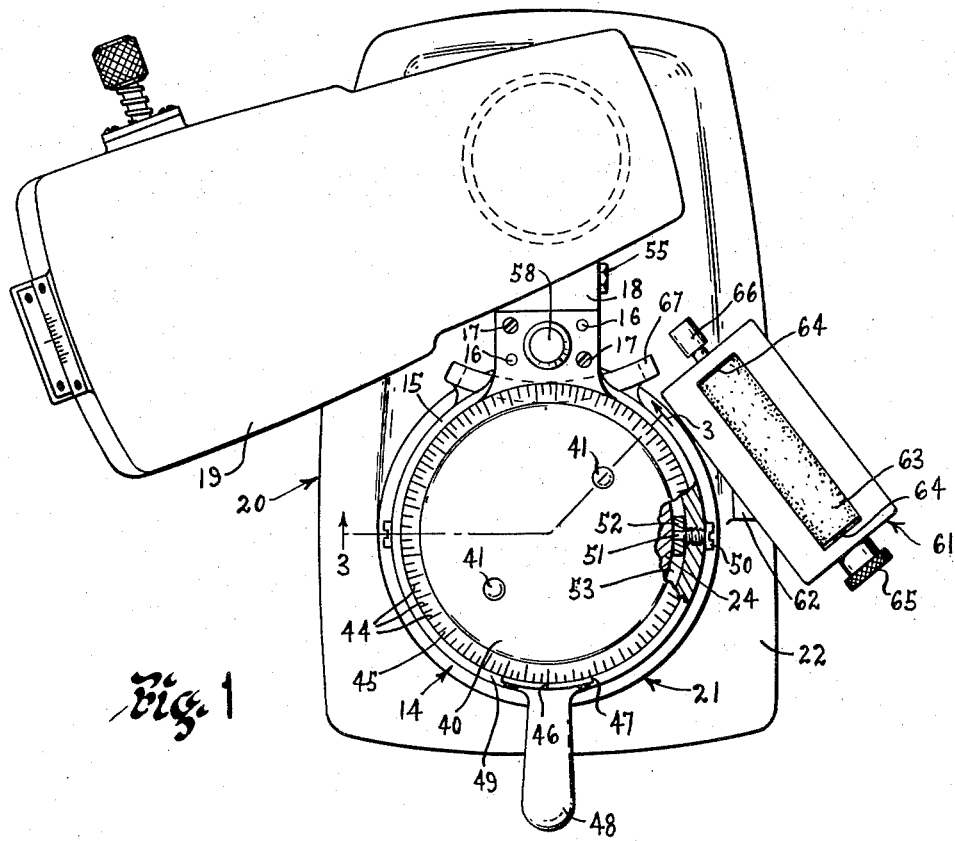
Fig. 1 is a top plan view of the device embodying the invention.

Referring more particularly to the drawings wherein like characters of reference designate like parts throughout the several views, there is illustrated in Fig. 7 a typical example of a semifinished multicocal lens blank 10 comprising a reading or segment portion 10a surrounded by a distance or major portion 10b which is provided with a diametrical row of contiguously related dots 12 arranged to present an axis line 11 thereon in accordance with the present invention. Said axis line 11 is provided with a slight spacing each side of the centermost dot 12a therein to allow said centermost dot 12a to be more easily distinguished from the remaining dots since said dot 12a is to represent the optical center of the major portion 10b of the finished lens.

In the manufacture of ophthalmic lenses of the above type it is customary to first provide one side of a lens blank with a finished optical surface thereon according to a prescribed formula or the like and to thereafter provide said finished surface with reference markings designating the desired positional relationship of the optical center of the major portion 10b with respect to the segment portion 10a and the axis of a cylindrically curved surface to be provided upon the opposed surface thereof according to other coordinated prescriptive requirements desired of the finished lens.

Two examples of many markings which might be applied to lens blanks of the above type are illustrated in Figs. 7 and 8 wherein Fig. 7 illustrates a cylindrical axis line 11 positioned at 180° or along the horiontal axis A—A of lens blank 10 having its centermost dot 12a, representing the position of the optical center on said lens blank 10, located a predetermined distance B above the segment portion 10a thereof and centrally aligned with said segment portion 10a along the vertical axis C—C of the lens blank 10 whereas Fig. 8 illustrates axis line 11 angularly disposed with respect to the horizontal axis A—A of lens blank 10 and the optical center 12a slightly decentered to the left of the vertical axis C—C while being positioned a predetermined distance above the segment portion 10a.

Dots 13 are used to indicate points at which to gauge or check the lens thickness to determine prism effect in the lens blank and are positioned along an axis normal to axis line 11 and at a radial distance from the central dot 12a equal to the radial distance from said dot 12a to the outermost dots of said axis line 11 so as to provide four gauge points at equal radial distances from said central dot 12a.

It is to be pointed out that the reading or segment portions of the lens blanks may be of various different shapes and sizes and that the reference markings shown in Figs. 7 and 8 are used for illustrative purposes only and that the positional relationship of said reference markings would vary according to the prescriptive requirements of the finished lens.

Figure 2:
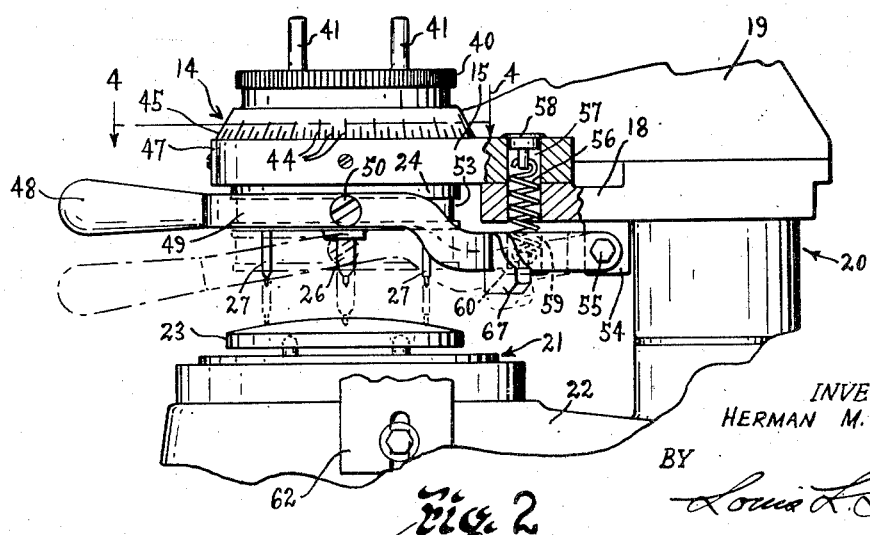
Fig. 2 is a fragmentary side elevational view of the device shown partially in section.

The device embodying the invention comprises a lens marking mechanism 14 mounted upon a supporting ring 15 which is attached by means of pins 16 and scrws 17 to an outwardly extending bracket 17. The bracket 18 is provided upon a head portion 19 of a lens aligning and marking device 20 which has a lens suporting table 21, provided upon the forward upper surface of a base 22, which is adapted to support a lens blank 23 or the like thereon. Said head portion 19 of the lens aligning and marking device 20 is pivotally mounted upon the base 22 so as to permit the marking mechanism 14 to be swung into vertical alignment over the lens blank 23 to a position as shown in Figs. 1 and 2.

Rotatably mounted within said supporting ring 15 there is provided a marking pin retaining member 24 having a cavity 25 formed therein through which a diametrically disposed row of marking pins 26 extend and a pair of normally related marking pins 27 extend. A centrally located pin 28 also extends through said cavity.

Said marking pins 26, 27 and 28 are slidably retained in positional alignment within the retaining member 24 by means of upper and lower guide plates 29 and 30, respectively, secured to the upper and lower sides of said supporting member by means of screws or the like 31 as shown in Fig. 5.

The plates 29 and 30 are each provided with a pair of rectangular slotted openings 32 diametrically aligned thereacross to receive the marking pins 26, and three circular openings 33 aligned so as to be positioned along an axis normal to the direction of said slotted openings 32. The outermost openings 33 are adapted to receive the marking pins 27 whereas the centermost opening thereof, being centrally aligned along both the directional axes of slotted openings 32 and circular openings 33, is adapted to receive the marking pin 28 therein.

Marking pins 26 being rectangular in cross-sectional area, as best shown in Fig. 4, are positioned within the slotted openings 32 of plates 29 and 30 with the sides thereof in intimate sliding relation with each other so as to extend downwardly through said slotted openings 32. Each pair of slotted openings 32, as shown best in Figs. 3 and 4, are so constructed as to allow only a vertical movement of pins 26 therein since the composite cross-sectional area of each group of pins 26 is substantially equal to the area of the slotted openings 32 as shown best in Fig. 4.

In order to restrict the downward movement of pins 26, a relatively small opening 34 is provided through each of said pins 26 adjacent the upper ends thereof and a flexible retaining wire 35, Figs. 3 and 4, is extended through said openings 34 so as to overlie the slotted openings 32 and engage the upper surface of plate 29 adjacent the opposed ends of said openings when said pins 26 are in a position such as shown in Figs. 3 and 4 and the centermost portion of wire 35 is provided with an elongated loop 35a extending between each group of pins 26 and in partial encircling relation with the pin 28. The function of the above arrangement will be described in detail hereinafter.

Marking pins 27 and marking pin 28 are formed circular in cross-section so as to conform to the shape of circular openings 33 also provided in vertical aligned relation in plates 29 and 30 for purposes of slidably guiding said pins 27 and 28 therein. The upper ends of said pins 27 and 28 are provided with enlarged shouldered portions 36 which are adapted to overlie openings 33 and engage the upper surface of plate 29 to restrict the downward movement thereof.

Since, for purposes to be described in detail hereinafter, it is essential that marking pins 26, 27 and marking pin 28 be permitted to be individually moved in a vertical direction and that a slight downward tension or force must be maintained upon said marking pins during said vertical movement in order to allow each individual marking pin to be accurately retained in its desired vertical position when in operation, a yieldable pressure pad 37, preferably formed of sponge rubber or the like, is positioned over and in contact with the upper ends of said marking pins as shown in Figs. 3 and 6.

In order to retain said pressure pad 37 in aligned relation upon said marking pins and to provide the desired tension thereon, elongated screws or the like 38, Figs. 4 and 6, are positioned so as to extend vertically through plate 29 and pressure pad 37 and threadedly engage a pressure plate 39 formed of a suitable metal or the like. By proper rotation of screws 38, the distance between the pressure plate 39 and the upper ends of the pins 28 may be varied thereby causing the pressure pad to be compressed or allowed to expand as desired whereby a predetermined downward tension or pressure can be applied to said marking pins.

During the individual vertical movement of marking pins 26, the flexible retaining wire 35 is free to conform to said movement and in order to prevent the looped portion 35a thereof from assuming a vertical position between the upper surface of plate 29 and the lower surface of the yieldable pressure pad 37, and which would interfere with the operation of said pressure pad 37, said loop 35a is constructed of a length greater than the maximum spacing which would be encountered between said plate 29 and lower surface of pressure pad 37 during normal operation of the device.

The lower ends of marking pins 26, 27 and 28 are each provided with a reduced shouldered portion having a conically pointed end thereon as shown in Figs. 2 and 3. Each of said pointed ends is so constructed as to provide a means for transferring a restricted supply of marking fluid to the surface of a lens blank or the like so as to provide said lens blank with relatively small closely related reference markings of the character shown in Figs. 7 and 8.

It is to be particularly pointed out that since each group of marking pins 26 is constructed and assembled in the manner described above that the conically pointed ends thereon are aligned so as to provide relatively short spacings therebetween for the purpose of providing a cylindrical axis reference marking as shown in Figs. 7 and 8, which is a more positive indication of a straight line that would be the case wherein said marking pins were widely spaced relative to each other as has been the practice heretofore, and it is also to be noted that the retaining member 24, marking pins 26, 27, marking pin 28, plates 29 and 30, pressure pad 37 and pressure plate 39 form a complete assembled unit which is vertically adjustable in a manner to be described as follows:

Retaining member 24 is slidably mounted upon a rotatable upper carrier 40 by means of guide pins 41 which are press fitted or otherwise secured thereto and extend upwardly through openings 42, Figs. 3 and 4, provided in the carrier 40 which are adapted to provide an accurate, vertically aligned sliding fit with said pins 41.

Carrier 40 has formed thereon a reduced downwardly extending portion 40a, Figs. 3, 5 and 6, which is adapted to fit within the supporting ring 15 and said portion 40a is provided with an annular groove or the like 40b adapted to receive a spring-loaded pin 43 which extends through the supporting ring 15 to frictionally engage said groove 40b and prevent carrier 40 from being accidentally lifted or otherwise displaced from the supporting ring 15, as well as to provide an adjustable tension upon said carrier 40 to retain it in adjusted position after rotation thereof.

Rotation of carrier 40 will cause the retaining member 24 to rotate therewith due to the connecting guide pins 41 and thus angularly position the assembled marking pins 26, 27 and 28. In order to indicate the angular position of said marking pins, degree markings or the like 44 are provided upon the inwardly tapering portion 45 of the carrier 40 which are adapted to be aligned with an indicating mark 46 provided upon the upper edge of a plate 47 which is secured to the supporting ring 15 as shown in Figs. 1 and 2.

Operation of the lens marking mechanism 14 is accomplished by means of an outwardly extending handle or the like 48 integrally formed upon a pivotally mounted yoke 49 having two diametrically opposed pivot pins 50 threadedly secured therein. Each of said pivot pins 50 is further provided with reduced shouldered portions 51 which pivotally engage guide blocks 52 adapted to slidingly fit within an annular channel 53 provided upon the downwardly extending portion of the retaining member 24.

The inwardly extending portion of the yoke 49 is pivotally secured to a downwardly extending lug 54, Fig. 2, formed upon the supporting bracket 18, by means of studs or the like 55 and in order to yieldably retain said yoke 49 and retaining member 24 assembly upwardly and in contact with the supporting ring 15 when not in use, the upper portion of a spring 56 is positioned within a vertically extending bore 57 provided in said supporting ring 15 and bracket 18 and is attached to a shouldered retaining member 58 whereas the lower end of said spring 56 is positioned within a similar bore 59 provided in the yoke 49 and is attached to a second shouldered retaining member 60.

Downward movement of the handle 48 will cause the yoke 49 to pivot about studs 55 and extend the spring 56 at which time the retaining member 24 is carried downwardly with said yoke 49 due to its connected relation therewith. Upon release of handle 48 the tension provided by spring 56 will then cause said yoke 49 and retaining member 24 assembly to again return to its initial raised position.

It will be noted in Fig. 2 that the downward movement of the retaining member 24, as shown by dot-dash lines, causes guide pins 41 carried by said retaining member 24 to slide within the openings 42 thereby causing the marking pins 26, 27 and 28 to be moved along a vertical axis while yoke 49 is pivoted about studs 55.

An inkwell 61, Fig. 1, is mounted upon the base of the device by means of a suitable bracket or the like 62 and is provided with a rotatable inking pad 63. The pad 63 is mounted upon a longitudinally extending shaft 64 which is rotatably supported at each end of said inkwell. One end of the shaft has provided thereon, a knurled knob 65 for manual rotation of the pad 63 and the opposed end thereof is provided with a roller 66 so positioned as to be engaged by a track or the like 67 integrally formed upon the yoke 49, Figs. 1 and 2.

Clockwise rotation of the head 19, so as to cause said head 19 to assume the position shown in Fig. 1, will cause the track 67 to contact the roller 66 and rotate the pad 63 within the inkwell 61. By such rotation a supply of ink, which would be provided in the bottom of the well 61, will be distributed over the surface of said pad 63 and continued clockwise rotation of the head 19 will further cause the marking pins 26, 27 and 28, being in their uppermost position, to lightly contact the pad 63 thereby having a supply of ink deposited upon the lower ends thereof.

The above mentioned rotation of the head 19 is continued until the lens marking mechanism 14 is accurately aligned over a lens blank which in turn is positioned at a predetermined location upon the lens supporting table 21, as shown in Figs. 1 and 2, whereupon the handle is depressed and thereby causes the marking pins 26, 27 and 28 to contact and deposit an ink spot upon the surface of said lens blank. The spots made by the pins 26, however, are so closely related as to produce an effectively continuous line.

It will be noted that in the case where the convex surface of a lens blank 23 is to be marked, as illustrated in Fig. 2, the centermost marking pin 28 which is to mark the optical center of said lens blank will contact the surface first and be forced upwardly against the pressure pad 37 and that each successive pair of marking pins which are disposed at equal radial distances from said center pin 28 will in turn be caused to contact said lens surface and be likewise forced upwardly until all have contacted said surface and deposited their respective supplies of marking fluid thereon so as to provide reference markings substantially of the type shown in Figs. 7 and 8 and described above. If, however, the concave side of a lens blank were to be marked, the outermost of said marking pins would contact the lens blank surface first and the centermost marking pin 28 would contact said surface last to cause markings to be applied thereto which would be identical in nature to the above, and it is to be pointed out that the pressure pad 37 is so constructed as to yieldably retain the marking pins in a downwardly direction while allowing individual vertical adjustment of said marking pins in conformity with the contour of the lens surface to be marked.

From the foregoing description, it will be seen that simple, efficient and economical means have been provided for accomplishing all the objects and advantages of the invention. However, it will be understood that various omissions, substitutions and changes in the forms and details of the embodiment illustrated may be made by those skilled in the art without departing from the spirit of the invention.

Having described my invention, I claim:

1. A device of the character described comprising a rotatable supporting member having diametrically aligned guideways therein, one of said guideways being disposed substantially intermediate of and spaced from the remaining guideways, a single elongated marking pin in said intermediate guideway and having one of its ends extending outwardly of said supporting member and being longitudinally movable along an axis substantially coincident with the axis of rotation of said supporting member, a group of relatively thin elongated marking pins in side surface engaging relation with each other mounted in each of said remaining guideways, each of said pins having one of its ends extending outwardly of said supporting member and being individually longitudinally movable along a path parallel to the path of movement of said single marking pin, each of said marking pins having a slightly reduced pointedly shaped outer end for receiving a supply of marking fluid to be deposited thereby in the form of a dot upon the surface of a lens blank or the like to be marked, stop means adjacent the opposed end of each of said marking pins for restricting the longitudinal movement thereof in an outward direction and resilient means carried by said supporting member and in engagement with said opposed ends of said elongated marking pins to yieldably permit the outer ends of each of said marking pins to be individually longitudinally adjusted so as to cause the outer ends of each of said groups of pins and said center pin to assume the contoured shape of a lens blank surface curvature when said outer ends are positioned in contact with said lens blank surface whereby each of said groups of marking pins will form a dash-like line composed of contiguously related dots and said centermost marking pin will form a single dot intermediate and spaced from said dash-like lines on said lens blank.

2. In a device of the character described, the combination of a rotatable supporting member movable along its axis of rotation and elongated individually adjustable marking members carried by said supporting member, said supporting member having a central axially aligned guideway therein with a pair of elongated rectangularly shaped guideways spaced one at each side of said central guideway and diametrically aligned therewith, one of said marking members being positioned for longitudinal movement in said central guideway along the axis of rotation of said supporting member, other elongated relatively thin rectangularly shaped marking members positioned in side surface engaging relation with each other in each of said spaced rectangularly shaped guideways, each of said rectangularly shaped marking members being individually longitudinally movable in a direction parallel to the axis of rotation of said supporting member, said central marking member and rectangularly shaped marking members each having one of their ends extending outwardly of said supporting member and said outer ends being reduced in size and pointedly shaped to receive a marking fluid thereon for the purpose of each depositing said marking fluid in the form of a dot upon the surface of a lens blank to be marked, stop means adjacent the inner ends of said marking members for limiting the outwardly directed movement of said members and resilient means carried by said supporting member and in engagement with said inner ends of each of the marking members to yieldingly permit the outer ends of said marking members to individually assume the contoured shape of said lens blank surface when said marking members are moved into engaging relation therewith, means for adjustably rotating said supporting member about the longitudinal axis of said central marking member for causing said rectangularly shaped marking members to assume a desired angular rotated position relative to said lens blank surface and means for moving said supporting member along said longitudinal axis to cause said central marking member and said rectangular marking members to engage said lens blank surface and each deposits thereon its respective supply of marking fluid in the form of a central dot and a pair of dash-like lines composed of contiguously related dots spaced from and axially aligned with said central dot.

3. A device of the character described comprising a rotatable supporting member having a central elongated marking pin and a pair of spaced groups of elongated relatively thin flat sided marking pins in side surface engaging relation with each other, one of said groups of marking pins being disposed in spaced relation with and at each side of said central pin and diametrically aligned therewith, said marking pins being positioned to extend outwardly through said supporting member and restricted to be individually movable along a path substantially in line with their longitudinal dimension, stop means adjacent the inner ends of said marking pins for limiting the outwardly directed movement thereof, means for adjustably rotating said supporting member and spaced groups of marking pins about the axis of said central marking pin to cause said spaced groups of marking pins to assume a desired angularly rotated position relative to a side surface of a lens blank to be marked, the outer ends of said marking pins each being reduced in size and pointedly shaped to receive an individual supply of marking fluid thereon and means for moving said supporting member along the axis of said central pin to cause said outer ends of the marking pins to engage the surface of the lens blank and be automatically individually moved along their longitudinal axes so as to assume the contour shape of said surface and to each deposit their respective supply of marking fluid on said surface in the form of a central dot and a pair of dash-like lines composed of contiguously related dots axially aligned with the central dot whereby said central dot will indicate the optical center of a lens blank being marked and said dash-like lines will represent a desired axis marking when said lens blank is properly aligned with said supporting member.

References Cited in the file of this patent

UNITED STATES PATENTS

| | | |
|---|---|---|
| 425,495 | Demarest | Apr. 15, 1890 |
| 1,026,124 | Richards | May 14, 1912 |
| 1,255,127 | Baukat | Feb. 5, 1918 |
| 2,146,599 | Smith | Feb. 7, 1939 |
| 2,680,296 | Cronberger | June 8, 1954 |
| 2,712,180 | Lueck | July 5, 1955 |